(12) United States Patent
    Slesinski

(10) Patent No.: US 9,731,451 B2
(45) Date of Patent: Aug. 15, 2017

(54) CLAMPS AND METHODS OF FORMING CLAMPS

(71) Applicant: The Boeing Company, Huntington Beach, CA (US)

(72) Inventor: Raymond J. Slesinski, Arnold, MO (US)

(73) Assignee: The Boeing Company, Chicago, IL (US)

( * ) Notice: Subject to any disclaimer, the term of this patent is extended or adjusted under 35 U.S.C. 154(b) by 122 days.

(21) Appl. No.: 14/617,763

(22) Filed: Feb. 9, 2015

(65) Prior Publication Data

US 2015/0174825 A1    Jun. 25, 2015

Related U.S. Application Data

(62) Division of application No. 13/441,227, filed on Apr. 6, 2012, now Pat. No. 8,985,540.

(51) Int. Cl.
    *A47B 91/00*    (2006.01)
    *B29C 67/00*    (2017.01)
    (Continued)

(52) U.S. Cl.
    CPC .......... *B29C 67/0085* (2013.01); *B33Y 80/00* (2014.12); *F16B 2/12* (2013.01);
    (Continued)

(58) Field of Classification Search
    CPC ............................ Y10T 24/1397; Y10T 24/31
    (Continued)

(56) References Cited

U.S. PATENT DOCUMENTS 2,094,020 A * 9/1937 Pace ...................... B27G 11/02
                                                    215/399
2,313,361 A * 3/1943 Richards ............... F16D 41/066
                                                    192/45.001
(Continued)

FOREIGN PATENT DOCUMENTS

FR       2 723 213        2/1996
WO       WO02/097362     12/2002
WO       WO2005/043080    5/2005

OTHER PUBLICATIONS

English translation of abstract of FR 2 723 213 downloaded from Espacenet Mar. 23, 2012.

*Primary Examiner* — Terrell McKinnon
*Assistant Examiner* — Michael McDuffie
(74) *Attorney, Agent, or Firm* — Dascenzo Intellectual Property Law, P.C.

(57) ABSTRACT

Apparatuses include first and second monolithic members that are coupled together, that are configured to move relative to each other, and that are configured so that they cannot be decoupled from each other without destruction of one or both of the two monolithic members. Apparatuses further include a third monolithic member configured to be selectively coupled to at least one of the first monolithic member and the second monolithic member. Methods of forming and using such apparatuses also are disclosed. Some monolithic members are formed utilizing an additive manufacturing process so that they are restricted from being decoupled from each other. Some apparatuses define clamps. Some clamps are used to precisely align laser projection alignment targets for use with laser projection alignment systems.

15 Claims, 5 Drawing Sheets

(51) Int. Cl.
  *B33Y 80/00* (2015.01)
  *F16B 2/12* (2006.01)
  *B33Y 10/00* (2015.01)
  *B29L 31/00* (2006.01)

(52) U.S. Cl.
  CPC ..... *B29C 67/0051* (2013.01); *B29L 2031/727* (2013.01); *B33Y 10/00* (2014.12); *Y10T 24/44* (2015.01); *Y10T 24/44222* (2015.01); *Y10T 24/44265* (2015.01); *Y10T 24/44573* (2015.01)

(58) Field of Classification Search
  USPC ......... 248/689, 643, 229.15, 229.25, 226.11, 248/228.6, 231.71, 228.3, 228.4, 228.5, 248/316.1, 316.4, 230.3, 231.41; 403/256, 257
  See application file for complete search history.

(56) References Cited

U.S. PATENT DOCUMENTS

| | | | | |
|---|---|---|---|---|
| 2,455,578 A * | 12/1948 | Haller | ............ | B63H 20/02 248/643 |
| 2,876,027 A * | 3/1959 | Sulmonetti | ............ | F16B 2/10 248/229.15 |
| 3,943,877 A * | 3/1976 | Kemp | ............ | B63B 3/70 248/642 |
| 4,083,624 A * | 4/1978 | Timmer | ............ | H01R 11/26 269/249 |
| 4,828,210 A * | 5/1989 | Anderson | ............ | A01K 1/04 119/797 |
| 5,073,005 A | 12/1991 | Hubbs | | |
| 5,801,834 A | 9/1998 | Danielson et al. | | |
| 7,015,459 B2 | 3/2006 | Slesinski et al. | | |
| 7,158,241 B2 | 1/2007 | Slesinski et al. | | |
| 7,588,223 B2 * | 9/2009 | Wolvin | ............ | F16B 2/065 248/229.15 |
| 7,891,618 B2 * | 2/2011 | Carnevali | ............ | A47B 21/0314 248/228.5 |
| 8,443,472 B2 * | 5/2013 | Sherman | ............ | A47C 21/00 248/125.8 |
| 2004/0165943 A1* | 8/2004 | Herb | ............ | F16B 37/045 403/256 |
| 2006/0043662 A1* | 3/2006 | Blake | ............ | B25B 5/163 269/249 |
| 2007/1267556 | 11/2007 | Herskovic | | |
| 2009/0289161 A1* | 11/2009 | Nuttman | ............ | G09F 7/18 248/229.1 |
| 2012/0119427 A1* | 5/2012 | Weissenborn | ............ | A63C 11/04 269/95 |
| 2015/0272305 A1* | 10/2015 | Howard | ............ | A45F 5/02 29/428 |

\* cited by examiner

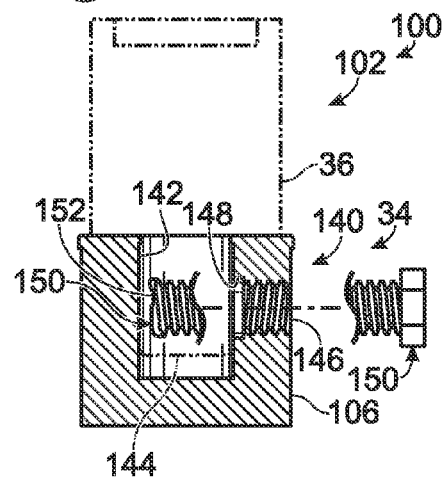
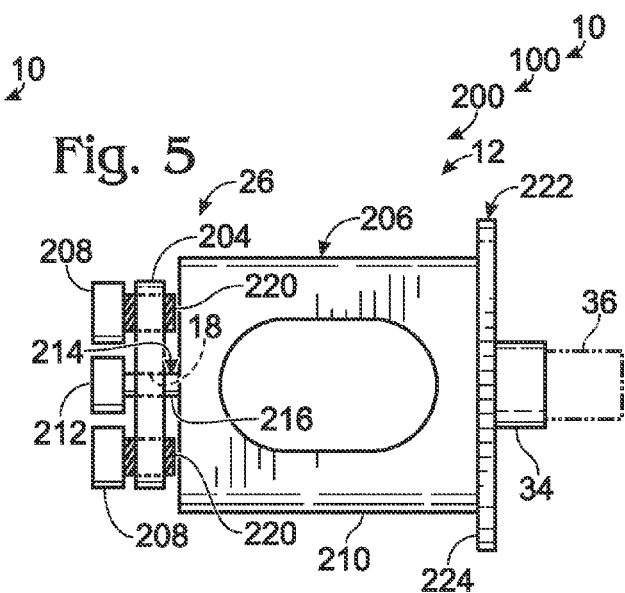
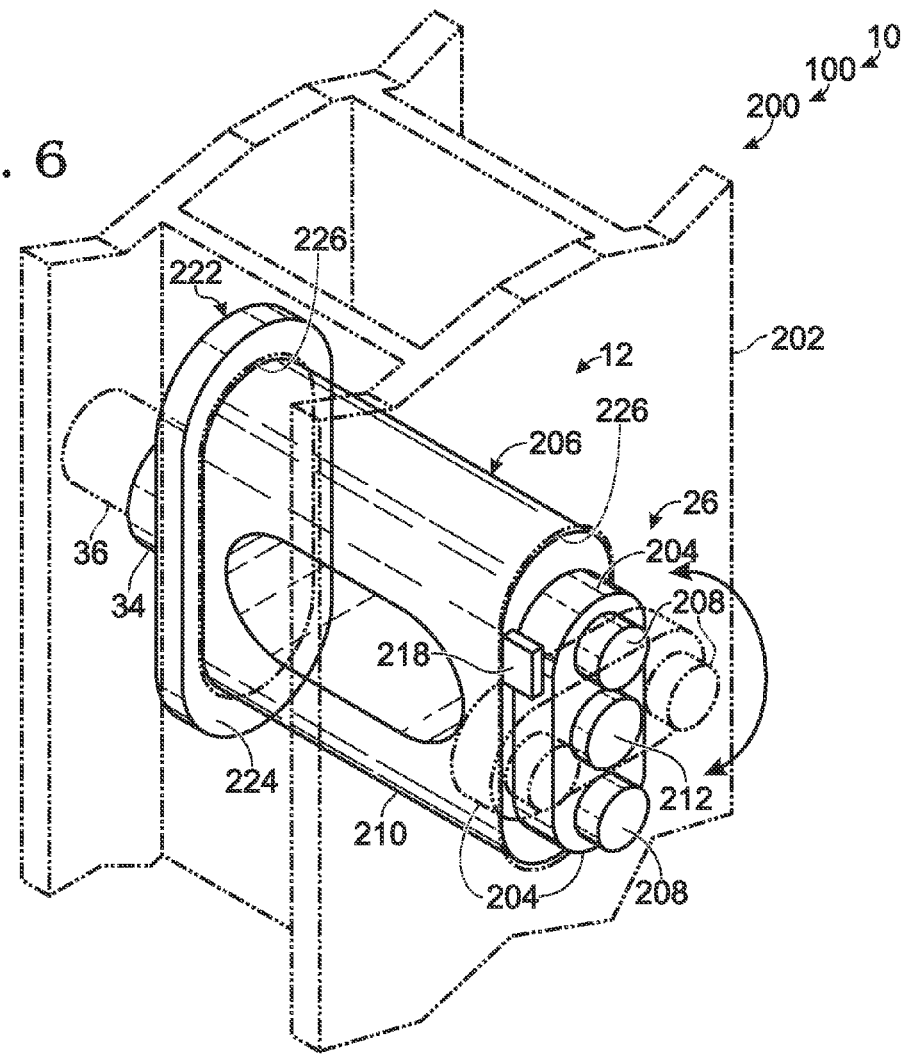

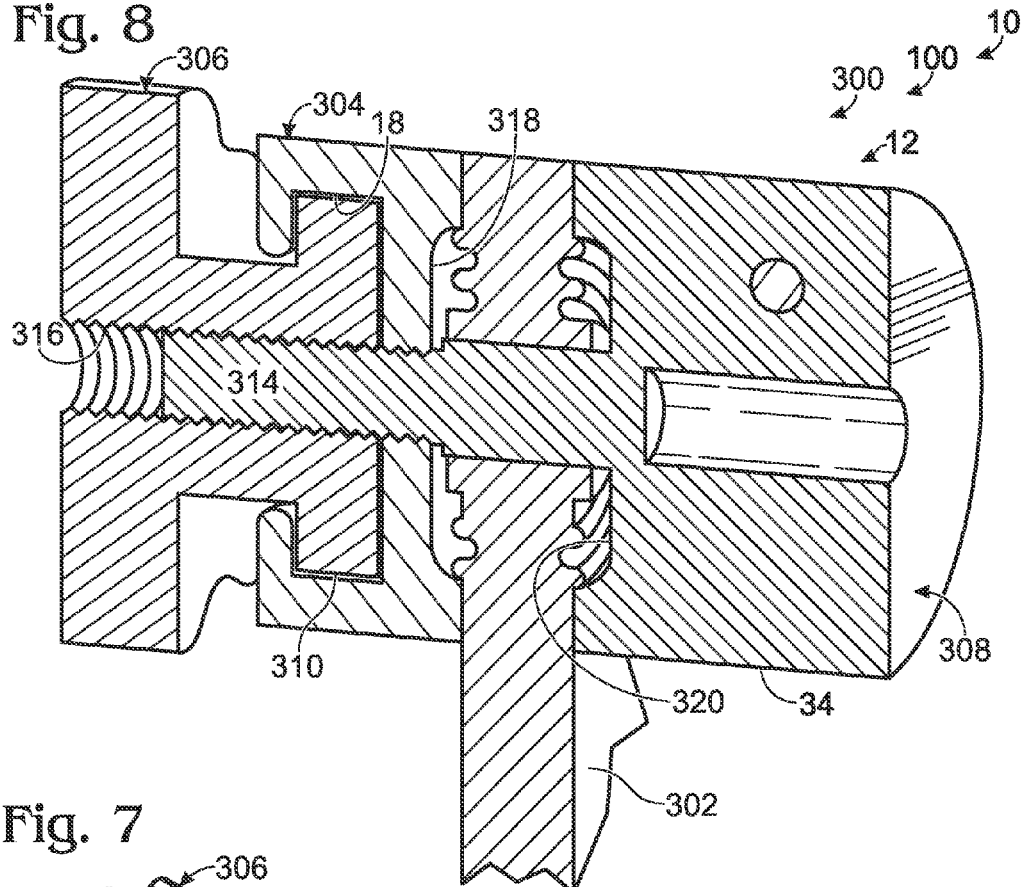
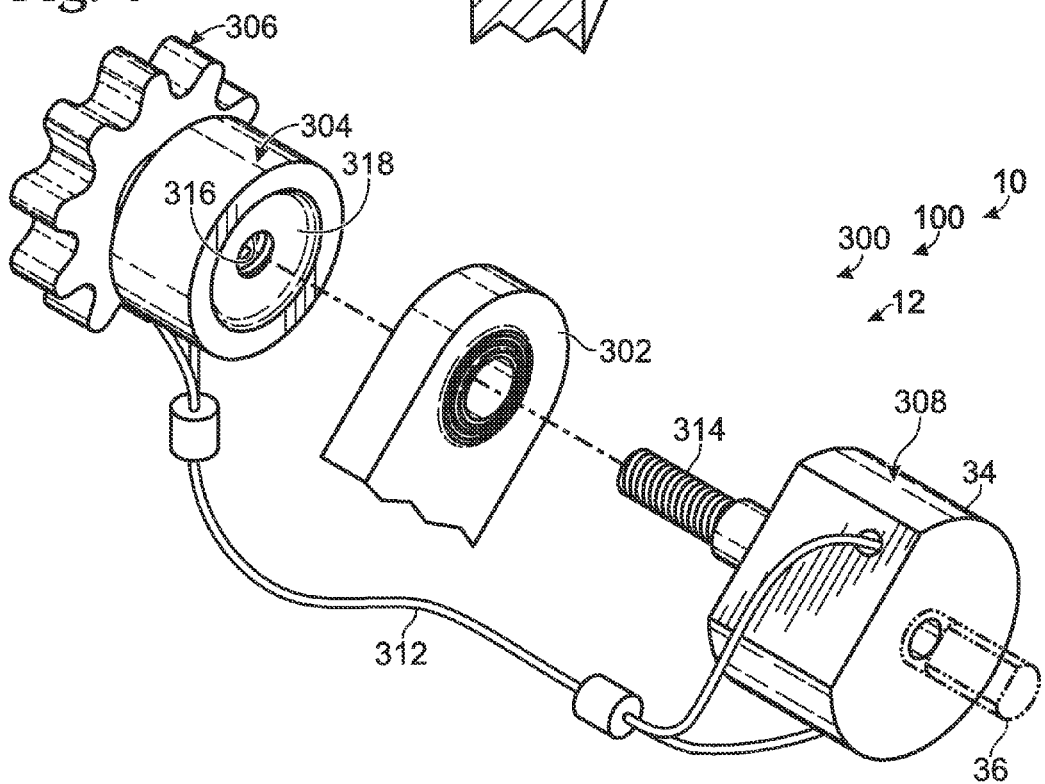

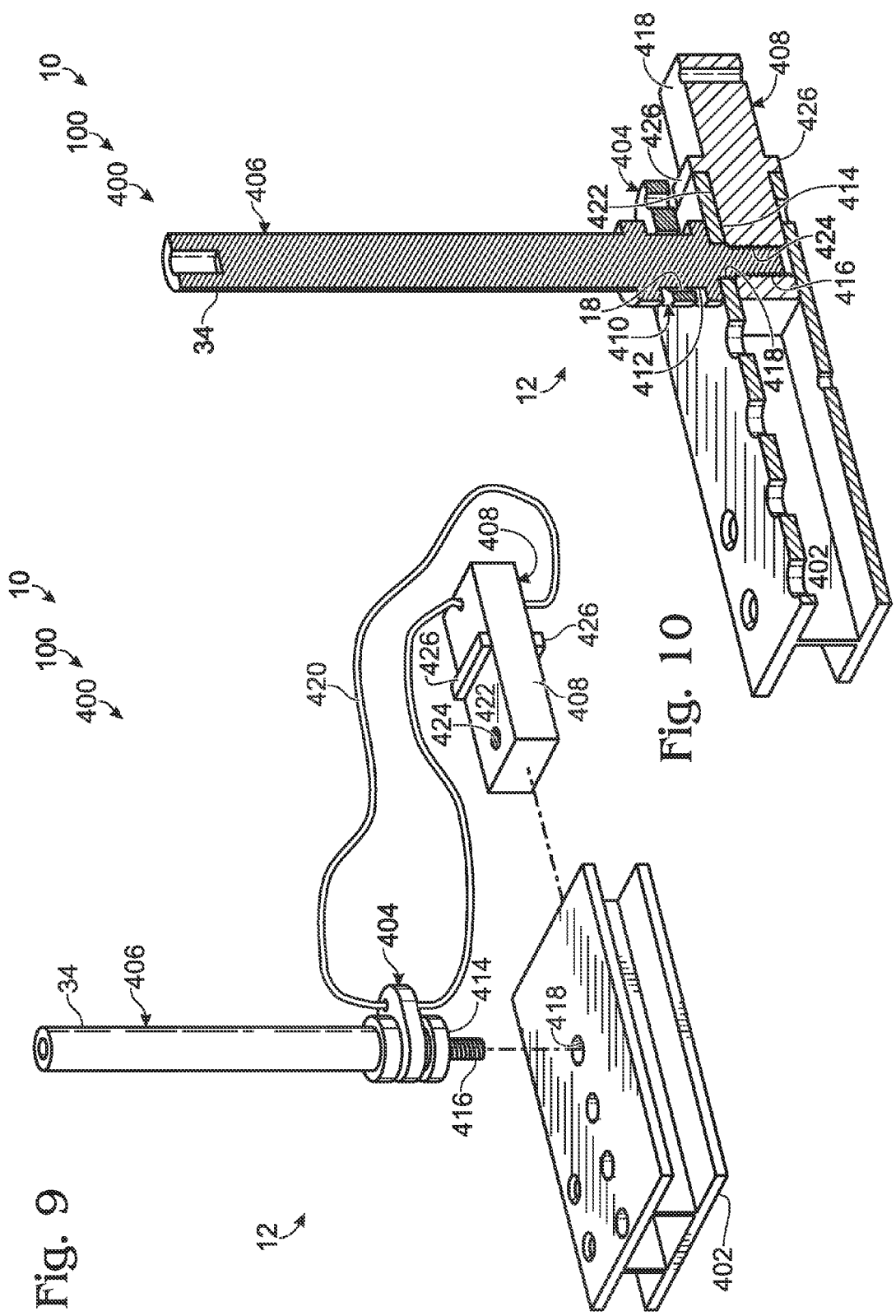

CLAMPS AND METHODS OF FORMING CLAMPS

RELATED APPLICATION

This application is a divisional of and claims priority under 35 USC §121 to U.S. patent application Ser. No. 13/441,227, entitled "CLAMPS AND METHODS OF FORMING CLAMPS," and filed on Apr. 6, 2012.

FIELD

The present disclosure relates to clamps.

BACKGROUND

Laser projection alignment systems often are used in connection with the assembly of large assemblies, such as aircraft. Laser projection alignment systems are used to project illuminated lines onto surfaces of subject articles. The projection of lines is useful to identify the desired location of component parts or features, such as the precise location of a hole to be drilled, for example. However, a laser projection alignment system must first be calibrated to a desired 3D computer model of the assembly, so that the lines are projected in precise desired locations relative to the assembly. To calibrate a laser projection alignment system, laser projection alignment targets, typically six, are positioned in known, precise positions that correspond to coordinates associated with a 3D computer model of the assembly. For example, laser projection alignment targets may be positioned precisely relative to holes or other structures that are associated with the 3D computer model of the assembly being assembled. The laser projection device may then be sequentially aimed at a subset of these targets, typically four, so that the laser projection alignment system detects the position of these targets relative to the laser projection device. The laser projection alignment system can then automatically determine, or find, the remaining targets, typically two. If the remaining targets are appropriately located by the laser projection alignment system, then calibration was successful. On the other hand, if the remaining targets are not successfully located, then calibration was not successful, and adjustments can be made until a desired confidence level is achieved. Examples of laser projection alignment systems are disclosed in U.S. Pat. Nos. 7,015,459 and 7,158,241, the contents of which are incorporated herein by reference.

During assembly of large assemblies, such as aircraft, it may be important to avoid foreign object damage, such as damage resulting from loose tools, loose fasteners, loose scraps, and the like becoming hidden or otherwise trapped in regions of the assembly. For example, in the context of an aircraft, if a tool or portion of a tool is dropped behind a bank of insulation, the tool or portion must be retrieved, which may require disassembly of components parts that took significant time and resources to install in the first instance.

SUMMARY

Clamps according to the present disclosure may be used, but are not required to be used, to precisely position a laser projection alignment target relative to an assembly being assembled and for use with a laser projection alignment system. Clamps according to the present disclosure include at least two monolithic members that are coupled together and configured so that they cannot be decoupled from each other without alteration of one of the two monolithic members. The monolithic members of clamps according to the present disclosure may be formed utilizing an additive manufacturing method so that they are restricted from being decoupled from each other. Because the monolithic members of clamps according to the present disclosure are restricted from being separated, they may be particularly well suited to avoid foreign object damage and inefficiencies associated with disassembly of already assembled components in an effort to retrieve dropped, or otherwise misplaced, components of clamps.

BRIEF DESCRIPTION OF THE DRAWINGS

FIG. 4 is a cross-sectional view of a portion of the clamp of FIG. 3, including a mount, together with a laser projection target coupled to the mount.

FIG. 5 is a side view of another illustrative, non-exclusive example of an apparatus according to the present disclosure in the form of a clamp for positioning a laser projection alignment target.

FIG. 6 is an isometric view of the clamp of FIG. 5, with the clamp illustrated in a clamped configuration and an unclamped configuration relative to an article.

FIG. 7 is an isometric view of another illustrative, non-exclusive example of an apparatus according to the present disclosure in the form of a clamp for positioning a laser projection alignment target, with the clamp illustrated in an unclamped configuration.

FIG. 8 is an isometric cross-sectional view of the clamp of FIG. 7, with the clamp illustrated in a clamped configuration relative to an article.

FIG. 9 is an isometric view of another illustrative, non-exclusive example of an apparatus according to the present disclosure in the form of a clamp for positioning a laser projection alignment target, with the clamp illustrated in an unclamped configuration relative to an article.

FIG. 10 is an isometric cross-sectional side view of the clamp of FIG. 9, with the clamp illustrated in a clamped configuration relative to an article.

DESCRIPTION

Apparatuses with at least two monolithic members that are coupled together in such a way that they cannot be separated without alteration of at least one of the monolithic members, methods of forming such apparatuses, and methods of using such apparatuses are disclosed herein. The apparatuses and associated methods disclosed may be particularly well suited for use with laser projection alignment systems, such as that are used in assembling large assemblies, such as aircraft; however, the apparatuses and associated methods may find application outside of such uses, and the present disclosure and disclosed apparatuses are not limited to laser projection alignment systems.

Figure 2:
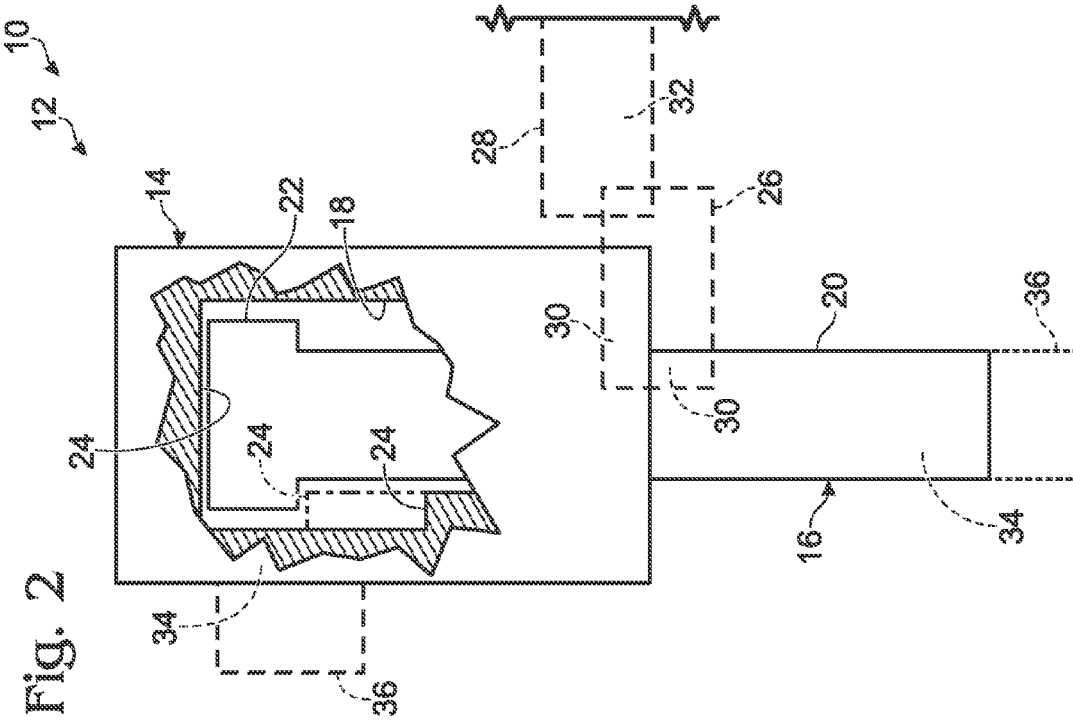
FIG. 2 is a diagram schematically representing additional illustrative, non-exclusive examples of apparatuses according to the present disclosure.
Figure 1:
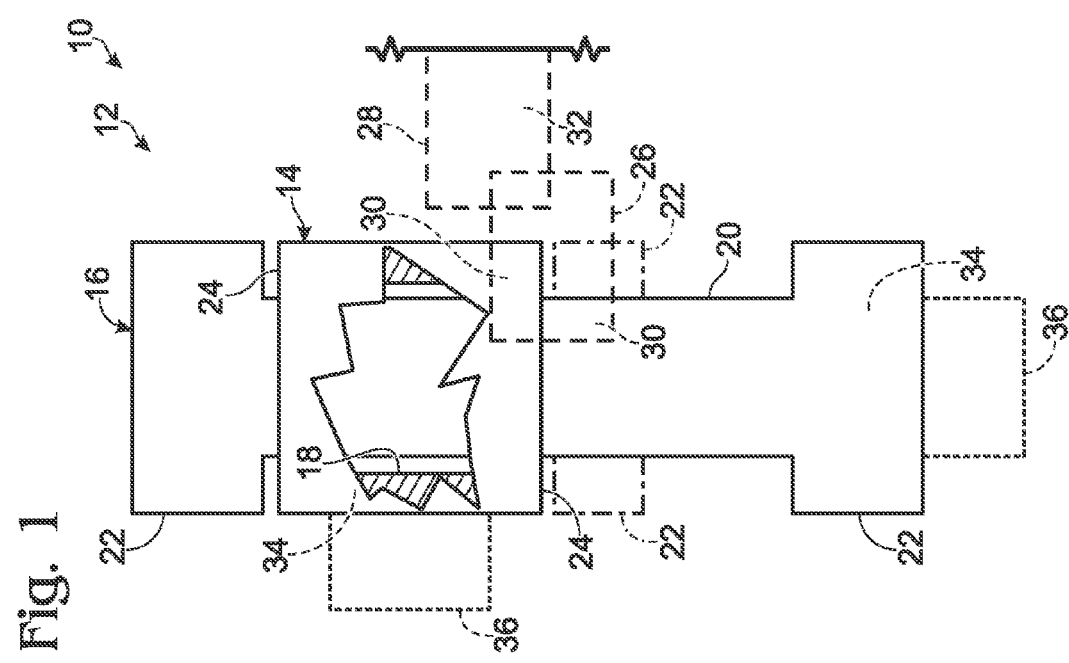
FIG. 1 is a diagram schematically representing illustrative, non-exclusive examples of apparatuses according to the present disclosure.

Illustrative, non-exclusive examples of apparatuses according to the present disclosure are schematically represented in FIGS. 1-2 and are indicated generally at 10. While FIGS. 1-2 are presented generally in the form of partial cut-away side views of the example apparatuses, the diagrams of FIGS. 1-2 are schematic in nature and are provided to broadly and generally illustrate relative relationships between the illustrated structures, including optional structures. FIGS. 1-2 are not intended to be to scale or to require the schematically illustrated relationships in all embodiments of apparatuses 10.

As schematically illustrated in FIGS. 1-2, an apparatus 10 includes at least two monolithic members 12; however, it is within the scope of the present disclosure that an apparatus 10 may include more than two monolithic members 12. To distinguish individual monolithic members 12 herein, the monolithic members may be described in terms of a first, second, third, etc. monolithic member. For example, the apparatuses 10 of FIGS. 1-2 include a first monolithic member 14 and a second monolithic member 16. However, such descriptors are not limiting with respect to monolithic members 12, and a first monolithic member 14 as recited in this description section may correspond to a second monolithic member as recited in a claim, or vice versa. Other examples, such as corresponding to a third monolithic member, also may occur. Moreover, with reference to the drawings, monolithic members 12 may be described without enumerated descriptors, such as referring to monolithic member 14 and/or monolithic member 16.

A monolithic member 12 is a structure that is unitary in nature and that is not comprised of an assembly of individual components. For example, a monolithic member 12, while having distinct regions, portions, and the like, includes only a single component. That is, a monolithic member 12 is not an assembly of two or more components. As an illustrative, non-exclusive example, a monolithic member 12 is free of welds, solders, adhesive, fasteners, etc. that interconnect two or more components together.

As mentioned and as schematically illustrated in FIGS. 1-2, apparatuses 10 include at least two monolithic members 12 that are coupled together in such a way that they cannot be separated without alteration of at least one of the monolithic members 12. Additionally or alternatively, at least two monolithic members 12 may be coupled together so that they cannot be separated without destruction or damage to one of the monolithic members 12.

With reference to FIGS. 1-2, first monolithic member 14 and second monolithic member 16 are coupled together, but are configured to be selectively moved relative to each other. For example, in FIG. 1, the monolithic members 12 are configured to be selectively translated relative to each other. This is schematically illustrated by monolithic member 14 defining a bore 18 and monolithic member 16 including a shaft 20 that extends at least partially through bore 18. In the example of FIG. 1, bore 18 extends completely through first monolithic member 14, and shaft 20 extends completely through bore 18. In the example of FIG. 2, bore 18 extends only partially through first monolithic member 14, and thus shaft 20 does not extend completely through monolithic member 14.

As a second example of selective relative movement between monolithic members 12, the first monolithic member 14 and the second monolithic member 16 may be configured to be selectively rotated relative to each other. The schematic representations of FIGS. 1-2 are interpreted to illustrate this optional relationship of monolithic members 12. As an illustrative, non-exclusive example, the configuration of bore 18 and shaft 20 may be suitable for selective rotation of first monolithic member 14 and second monolithic member 16 relative to each other. In some embodiments, bore 18 and shaft 20 may respectively define circular and concentric profiles; however, other configurations also are within the scope of the present disclosure.

To restrict separation of two monolithic members 12, monolithic members 12 may include one or more restrictive portions, with monolithic member 16 schematically indicated to include restrictive portions 22 and monolithic member 14 schematically indicated to include restrictive portions 24. In the example of FIG. 1, monolithic member 16 includes two restrictive portions 24 that are sized larger than bore 18 or that are otherwise configured to restrict passage of the restrictive portions 24 through bore 18 and thus to restrict separation of monolithic member 14 and monolithic member 16. Monolithic member 14 therefore may be described as including two corresponding restrictive portions 22 that are defined by the outer surface of the monolithic member 14. In the example of FIG. 2, monolithic member 16 includes a single restrictive portion 22 that is positioned within bore 18 but that is configured to engage restrictive portions 24 of monolithic member 14 that are defined by inner surfaces of monolithic member 14. Other configurations also are within the scope of the present disclosure.

As schematically illustrated in FIGS. 1-2 with an optional restrictive portion 22 and an optional restrictive portion 24, respectively, in dash-dot lines, it is within the scope of the present disclosure for an apparatus 10 to include monolithic members 12 that are not configured to be translated linearly relative to each other, but that are configured to be rotated relative to each other. Conversely, it also is within the scope of the present disclosure for an apparatus 10 to include monolithic members 12 that are configured to be translated linearly with respect to each other but that are not configured to be rotated relative to each other, and FIGS. 1-2 are interpreted to illustrate such an optional configuration.

Depending on the particular application of an apparatus 10, an apparatus 10 may include clamping structure 26 that is configured to selectively secure the apparatus 10 to an article 28. In such embodiments, the apparatus 10 additionally or alternatively may be described as a clamp. In FIGS. 1-2, clamping structure 26 is schematically represented by a dashed box that overlaps first monolithic member 14 and second monolithic member 16, schematically indicating that clamping structure 26 may be at least partially defined by one or both of first monolithic member 14 and second monolithic member 16. For example, as an illustrative, non-exclusive example, clamping structure 26 collectively may be defined by a restrictive portion 22 and a restrictive portion 24, such as that are configured to engage opposing sides of an article 28. It also is within the scope of the present disclosure that a clamping structure 26 be defined collectively by only one of first monolithic member 14 and second monolithic member 16 together with another component of an apparatus 10, which may or may not be a monolithic member 12.

As used herein, an article 28 may be any suitable article, structure, machine, etc. to which an apparatus 10 having an optional clamping structure 26 is desired to be secured. As illustrative, non-exclusive examples, an article 28 may include a bracket, a beam, a frame member, or any other suitable structure. As further illustrative, non-exclusive examples, an article 28 may be a component of an assembly that is being assembled or that is to be assembled. For example, an article 28 may be a component or portion of an aircraft, such as an aircraft fuselage. Illustrative, non-exclusive examples of articles 28 that are components of an aircraft include (but are not limited to) an aircraft fuselage frame member, an aircraft cargo bay stanchion, and an aircraft seat track.

In some embodiments, at least one monolithic member 12 may include and/or define an apparatus alignment structure 30 that is configured to mate with a corresponding article alignment structure 32 for precise alignment of the apparatus 10 relative to an article 28. In FIGS. 1-2, both first monolithic member 14 and second monolithic member 16 are schematically indicated as optionally including apparatus alignment structure 30 within the dashed box that schematically represents optional clamping structure 26, schematically representing that a portion of a monolithic member 12 that defines clamping structure 26 additionally or alternatively also may define or include apparatus alignment structure 30. By "precise alignment," it is meant that optional apparatus alignment structure 30 may be specifically configured to mate with or otherwise correspond to an article alignment structure 32 associated with an article 28. Accordingly, when apparatus alignment structure 30 mates with article alignment structure 32, and optionally clamping structure 26 secures the apparatus 10 to the article 28, the apparatus 10 will be positioned in a known or predetermined position relative to the article 28. Such a configuration may be desired, for example, in the application of an apparatus 10 being used as a component of a laser projection alignment system, as discussed herein and which relies on having precise coordinates associated with articles 28 and portions thereof.

Illustrative, non-exclusive examples of apparatus alignment structure 30 include (but are not limited to) projections or shafts that are configured to mate with article alignment structure 32 in the form of corresponding depressions or holes, depressions or holes that are configured to mate with article alignment structure 32 in the form of corresponding projections or shafts, contoured surfaces that are configured to mate with article alignment structure 32 in the form of corresponding contoured surfaces, etc.

In some embodiments, as schematically indicated in FIGS. 1-2, one or more monolithic members 12 optionally may include a mount 34 that is configured to selectively couple an associated structure 36 to the apparatus 10. For example, as mentioned, an apparatus 10 may be configured or otherwise suitable for use with a laser projection alignment system. In such embodiments, the associated structure 36 may include a laser projection alignment target for use with a laser projection alignment system. Because laser projection alignment systems rely on coordinates associated with articles 28 and portions thereof, an optional mount 34 may be described as being configured to selectively couple a laser projection alignment target to an apparatus 10 in a predetermined precise position relative to the apparatus 10. Accordingly, the position of the laser projection alignment target relative to a specific coordinate associated with the article 28 may be input into the laser projection alignment system for calibration thereof.

Apparatuses 10 may be constructed utilizing any suitable method. As an illustrative, non-exclusive example, an apparatus 10 may be constructed utilizing an additive manufacturing method. Additive manufacturing is a type of manufacturing in which components are grown in layers of material based on a 3D computer model of the component. Examples of additive manufacturing methods include fused deposition modeling, selective laser sintering, electron beam melting, aerosol jetting, inkjet processes, semi-solid freeform fabrication, and stereolithography. Additive manufacturing additionally or alternatively may be referred to as 3D printing. Examples of materials that may be used to form components utilizing an additive manufacturing method include (but are not limited to) plastics, metals, ceramics, resins, and glass. Accordingly monolithic members 12 may be constructed of any such suitable material depending on the application and desired properties of the monolithic members 12.

Because additive manufacturing methods construct components by building up, or growing, layers of material, monolithic members 12 may be constructed together and in a coupled configuration, such that once fully constructed, the monolithic members 12 cannot be separated without alteration, damage, and/or destruction of one or more of the monolithic members 12.

As an illustrative, non-exclusive example, it may be desirable during the assembly of aircraft to minimize the potential for foreign object damage, such as resulting from a loose tool or portion of a tool from becoming hidden or lost, or otherwise requiring disassembly of component parts that took significant time and resources to install in the first instance. Accordingly, apparatuses 10 may be particularly well suited as tools, such as clamps, used during the assembly process. Because the movable parts of the tool cannot be separated, it becomes less likely that a portion of a tool will result in foreign object damage or inefficiencies resulting from disassembly of already assembled components.

Turning now to FIGS. 3-10, illustrative non-exclusive examples of apparatuses 10 in the form of clamps 100 are illustrated. Where appropriate, the reference numerals from the schematic illustrations of FIGS. 1-2 are used to designate corresponding parts of clamps 100; however, the examples of FIGS. 3-10 are non-exclusive and do not limit apparatuses 10 to the illustrated embodiments of clamps 100. That is, apparatuses 10 are not limited to the specific embodiments of the illustrated clamps 100, and apparatuses 10 may incorporate any number of the various aspects, configurations, characteristics, properties, etc. of apparatuses 10 that are illustrated in and discussed with reference to the schematic representations of FIGS. 1-2 and/or the embodiments of FIGS. 3-10, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to clamps 100; however, it is within the scope of the present disclosure that the previously discussed features, variants, etc. may be utilized with clamps 100.

Figure 3:
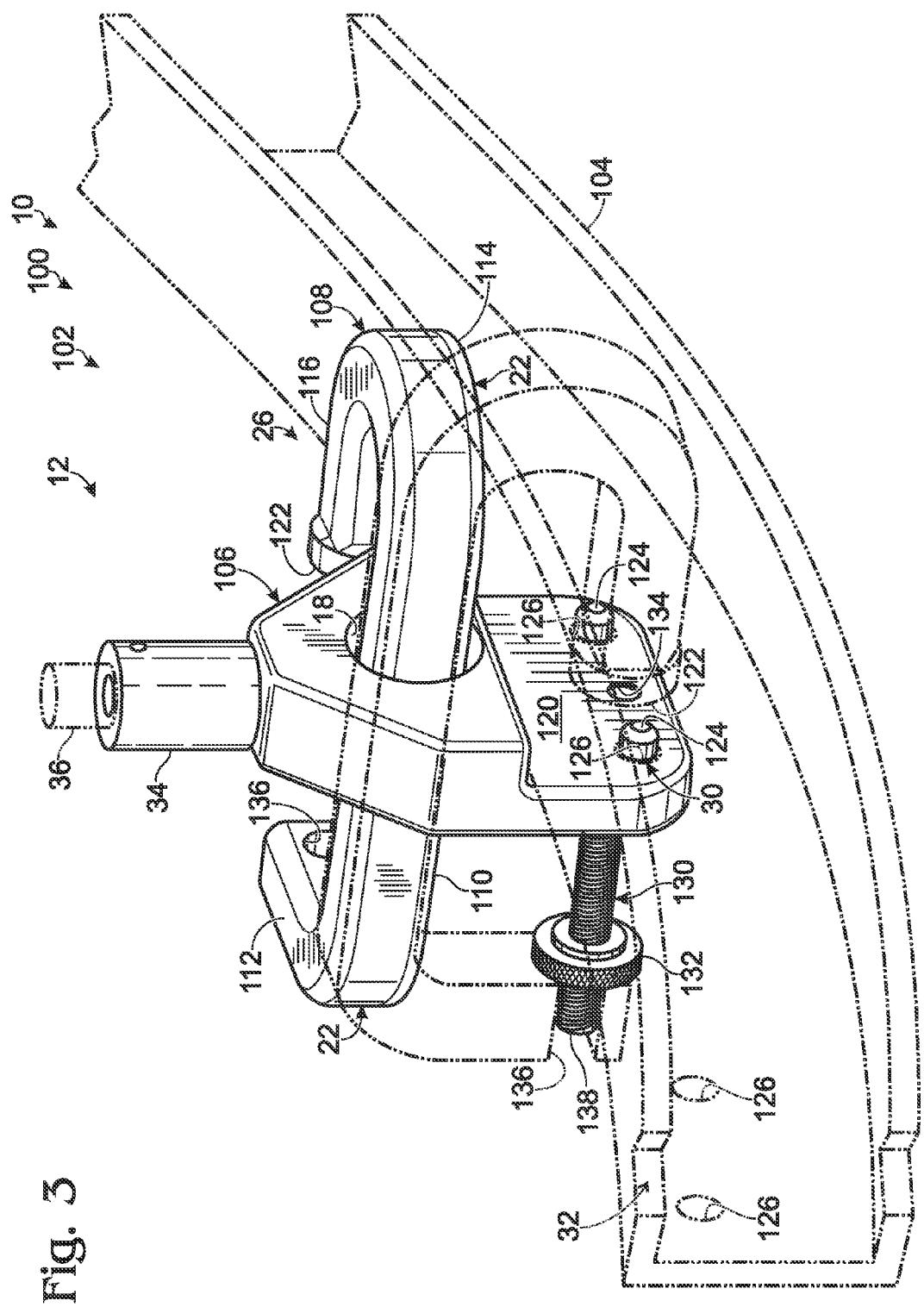
FIG. 3 is an isometric view of an illustrative, non-exclusive example of an apparatus according to the present disclosure in the form of a clamp for positioning a laser projection alignment target, with the clamp illustrated in a clamped configuration and an unclamped configuration relative to an article.

FIG. 3 illustrates an example of a clamp 100 in the form of a clamp 102 that is configured to precisely position a laser projection alignment target relative to an aircraft fuselage frame member 104; however, clamp 102 and its general configuration and functionality may be used and/or adapted to be used for positioning any associated structure 36 relative to any article 28. Clamp 102 is an example of an apparatus 10, in which two monolithic members 12 are configured to be selectively rotated relative to each other and translated linearly relative to each other. Clamp 102 includes two monolithic members 12, including a first monolithic member 106 and a second monolithic member 108 that collectively define clamping structure 26. In FIG. 3, clamp 102 is illustrated in solid lines in a clamped configuration relative to the frame member 104 and with the second monolithic member 108 in dashed lines in an unclamped configuration. Additionally or alternatively, the second monolithic member 108, as illustrated in dashed lines, may be described as being in an unclamped position.

The first monolithic member 106 defines a bore 18. The second monolithic member 108 includes an elongate portion 110 that extends through the bore 18, a first end portion 112 that extends transverse from the elongate portion 110, an intermediate portion 114 that extends transverse from the elongate portion 110 and that is opposite the first end portion 112, and a second end portion 116 that extends transverse from the intermediate portion 114 and generally parallel to the elongate portion 110. The elongate portion 110 is configured to be selectively translated and rotated relative to the bore 18 of the first monolithic member 106 amongst a plurality of positions. Accordingly, elongate portion 110 may be described as a shaft 20. The first end portion 112 defines a restrictive portion 22 of the second monolithic member 108, and the intermediate portion 114 and second end portion 116 collectively also define a restrictive portion 22 of the second monolithic member 108.

The first monolithic member 106 defines a first clamping surface 120, and the second end portion 116 of the second monolithic member 108 defines a second clamping surface 122. When the clamp 102 is in its clamped configuration, the first clamping surface 120 and the second clamping surface 122 generally face each other. When the second monolithic member is in an unclamped position and thus the clamp 102 is in an unclamped configuration, the first clamping surface 120 and the second clamping surface 122 do not generally face each other.

The first monolithic member 106 includes apparatus alignment structure 30 in the form of a pair of projections 124 that extend from the first clamping surface 120. In the illustrative, non-exclusive example of clamp 102, the projections 124 are specifically configured to mate with corresponding article alignment structure 32 in the form of a pair of alignment holes 126 that are associated with and positioned relative to a stringer of an aircraft fuselage. In some examples, the alignment holes 126 may be referred to as EA holes 126.

Clamp 102 also includes a shaft 130 coupled to and extending from the first monolithic member 106, generally opposite the first clamping surface 120. An anchor 132 is coupled to the shaft 130 and is configured to be selectively translated along the shaft 130. In the illustrated embodiment, the shaft 130 is a threaded shaft 130 and the anchor is a threaded nut 132; however, other configurations are within the scope of the present disclosure. It is within the scope of the present disclosure that the shaft 130 is part of the first monolithic member 106, such as constructed together with the entirety of the first monolithic member 106 utilizing an additive manufacturing method. In the illustrated embodiment, however, the shaft 130 is separately constructed and is coupled to, and preferably permanently coupled to, the first monolithic member 106, such as by being threaded into a threaded hole 134 defined by the first monolithic member 106 and with the threads of the shaft 130 being damaged, so as to restrict removal of the shaft 130 and thus separation of the shaft 130 from the first monolithic member 106. It also is within the scope of the present disclosure that the anchor 132 and the shaft 130 are configured so that the anchor 132 cannot be decoupled from the shaft 130 without alteration, or optionally without destruction or damage, to one of the shaft 130 and the anchor 132. For example, in the example of a threaded shaft 130 and a threaded nut 132, the threads associated with the distal end region 138 of the threaded shaft 130 may be purposefully damaged, so as to restrict the threaded nut 132 from being unthreaded from the threaded shaft 130. Other configurations also are within the scope of the present disclosure.

The first end portion 112 of the second monolithic member 108 defines a channel 136 that is positioned and configured to align with and receive the distal end region 138 of the shaft 130 when the second monolithic member 108 is positioned in a clamped position, such as illustrated in solid lines in FIG. 3. Accordingly, to secure clamp 102 to the frame member 104, a user may first align and mate the projections 124 with the alignment holes 126, second rotate the second monolithic member 108 into its clamped position with the distal end region 138 received in the channel 136, and third translate the anchor 132 along the shaft 130, away from the first monolithic member 106 and toward distal end region 138 until it engages the first end region 112 of the first monolithic member 106. As a result, the second monolithic member 108 is retained in its clamped position, the clamp 102 is retained in its clamped configuration, and the clamp 102 is secured to the frame member 104. Accordingly, the clamp 102 is secured to the frame member 104 in a precise position relative to known properties of the frame member 104, such as the alignment holes 126.

In FIG. 4, the illustrative, non-exclusive example of the mount 34 of clamp 102 is indicated at 140. Mount 140 also may be incorporated into any suitable apparatus 10 according to the present disclosure, including the clamps of FIGS. 5-10, and is not limited to being used with clamp 102. An associated structure 36 also is illustrated in FIG. 4 in dashed lines, and which may be a laser projection alignment target. In the illustrated example, mount 140 is integral to the first monolithic member 106; however, other configurations are within the scope of the present disclosure, as discussed herein. Mount 140 defines an internal bore 142 configured and sized to receive a corresponding shaft 144 of an associated structure 36. A threaded hole 146 extends through mount 140 intersecting with the internal bore 142. A counter bore 148 is positioned on the internal bore side of the threaded hole 146, and a set screw 150 is mated with the threaded hole 146. To prevent the set screw 150 from inadvertently being unthreaded and removed from the threaded hole 146, the inner end region 152 of the set screw 150 is damaged, so as to engage the counter bore 148 when a user loosens the set screw. However, when a user tightens the set screw 150, it will engage the shaft 144 of the associated structure 36 to secure the associated structure 36 to the mount 140 and thus to the clamp 102.

FIGS. 5-6 illustrate another illustrative, non-exclusive example of a clamp 100 in the form of a clamp 200. Clamp 200 is an example of an apparatus 10, in which two monolithic members 12 are configured to be selectively rotated relative to each other but not to be translated linearly relative to each other. Clamp 200 is configured to precisely position a laser projection alignment target relative to an aircraft cargo bay stanchion 202; however clamp 200 and its general configuration and functionality may be used and/or adapted to be used for positioning any associated structure 36 relative to any article 28. Clamp 200 includes two monolithic members 12, including a first monolithic member 204 and a second monolithic member 206. Clamp 200 also includes a pair of screws 208 threadingly mated with the first monolithic member 204. The first monolithic member 204, the second monolithic member 206, and the screws 208 collectively define clamping structure 26. The screws 208 include clamping surfaces 220 that are positioned and configured to engage the aircraft cargo bay stanchion 202 when appropriately positioned as discussed herein. In some embodiments, the threads of the screws 208 are damaged so as to restrict removal of the screws 208 from the first monolithic member 204 while permitting selective rotation and translation of the screws 208 for engagement of the clamping surfaces 220 with the aircraft cargo bay stanchion 202. Second monolithic member 206 includes a mount 34, which is configured similarly to mount 140 of clamp 102 discussed herein.

The first monolithic member 204 defines a bore 18. The second monolithic member includes a body 210 and a shaft 212 that extends from the body 210 and through the bore 18 of the first monolithic member 204. The shaft 212 defines an outer channel 214 having a bottom surface 216. Channel 214 additionally or alternatively may be described as a circumferential groove 214. The first monolithic member 204 is positioned so that the bore 18 extends around the bottom surface 216 of the channel 214 and is configured to be selectively rotated relative to the second monolithic member 206. The second monolithic member 206 defines a stop 218 that is positioned to restrict rotation of the first monolithic member 204 and define a clamping position of the first monolithic member, which is illustrated in dash-dot-dot lines in FIG. 6. When in the clamping position, the first monolithic member 204 is positioned so that clamping surfaces 220 of screws 208 may be selectively translated toward and into contact with the aircraft cargo bay stanchion 202. In contrast, when in an unclamped position, which is illustrated in solid lines in FIG. 6, the first monolithic member is rotated approximately ninety degrees from the clamped position, with the clamping surfaces 220 of screws 208 generally facing the body 210 of the second monolithic member 206.

The second monolithic member 206 also includes a flange 222 that extends from the body 210 opposite the shaft 212. Flange 222 defines a clamping surface 224 that generally faces in the direction of the first monolithic member 204. The body 210 is configured to correspond to and mate with a slot 226 defined by the aircraft cargo bay stanchion 202, with the flange 222 being sized to restrict passage of the flange 222 through the slot 226. Accordingly, a user may selectively insert the body 210 of the second monolithic member 206 through the slot 226 until the flange 222 engages the cargo bay stanchion 202 and the first monolithic member 204 extends out from the slot 226. A user may then rotate the first monolithic member 204 from its unclamped position (illustrated in solid lines) to its clamped position (illustrated in dash-dot-dot lines) and translate the screws 208 so that the clamping surfaces 220 engage the cargo bay stanchion 202. As a result, the clamp 200 is secured to the cargo bay stanchion 202 in a precise position relative to known properties of the cargo bay stanchion 202, such as the slot 226.

FIGS. 7-8 illustrate another illustrative, non-exclusive example of a clamp 100 in the form of a clamp 300. Clamp 300 is an example of an apparatus 10, in which two monolithic members 12 are configured to be selectively rotated relative to each other but not to be translated linearly relative to each other. Clamp 300 is configured to precisely position a laser projection alignment target relative to an aircraft galley mono-ball fitting, or bracket, 302; however clamp 300 and its general configuration and functionality may be used and/or adapted to be used for positioning any associated structure 36 relative to any article 28. Clamp 300 includes three monolithic members 12, including a first monolithic member 304, a second monolithic member 306, and a third monolithic member 308.

The second monolithic member 306 includes a disc-shaped region 310 positioned within a bore 18 of the first monolithic member 304. The bore 18 and disc-shaped region 310 are configured to restrict separation of the first monolithic member 304 and the second monolithic member 306 without alteration, destruction or damage of at least one of the first monolithic member 304 and the second monolithic member 306.

The third monolithic member 308 is configured to be selectively coupled directly to and into engagement with the second monolithic member 306. In the illustrated example, the third monolithic member 308 also is tethered to the second monolithic member 306 by a tether 312. The third monolithic member 308 includes a mount 34 and a threaded shaft 314 extending from the mount 34. The second monolithic member 306 defines a threaded hole 316 that is configured to mate with the threaded shaft 314 of the third monolithic member.

The first monolithic member 304 defines a clamping surface 318 configured to engage the galley mono-ball fitting 302. Similarly, the third monolithic member 308 includes a clamping surface 320 configured to engage the galley mono-ball fitting 302 opposite the clamping surface 318 of the first monolithic member 304.

FIG. 7 illustrates clamp 300 in an unclamped configuration, and FIG. 8 illustrates clamp 300 in a clamped configuration. A user may selectively secure the clamp 300 to a galley mono-ball fitting 302 by inserting the threaded shaft 314 through the galley mono-ball fitting 302, through the bore 18 of the first monolithic member 304, and into threading engagement with the threaded hole 316 of the second monolithic member 306. Accordingly, when a user selectively rotates the second monolithic member 306 in a tightening direction, the clamping surface 318 and clamping surface 320 will translate toward each other and engage opposite sides of the galley mono-ball fitting 302, thereby securing the clamp 300 to the galley mono-ball fitting 302. As a result, the clamp 300 is secured to the galley mono-ball fitting 302 in a precise position relative to known properties of the galley mono-ball fitting 302. To remove the clamp 300 from the galley mono-ball fitting, a user simply rotates the second monolithic member 306 in the opposite direction until the threaded shaft 314 disengages the threaded hole 316.

FIGS. 9-10 illustrate another illustrative, non-exclusive example of a clamp 100 in the form of a clamp 400. Clamp 400 is an example of an apparatus 10, in which two monolithic members 12 are configured to be selectively rotated relative to each other but not to be translated linearly relative to each other. Clamp 400 is configured to precisely position a laser projection alignment target relative to an aircraft seat track 402; however clamp 400 and its general configuration and functionality may be used and/or adapted to be used for positioning any associated structure 36 relative to any article 28. Clamp 400 includes three monolithic members 12, including a first monolithic member 404, a second monolithic member 406, and a third monolithic member 408. Second monolithic member 406 includes a mount 34.

The first monolithic member 404 defines a bore 18, and second monolithic member 406 defines an outer channel 410 having a bottom surface 412. Outer channel 410 additionally or alternatively may be described as a circumferential groove 410. The bore 18 of the first monolithic member 404 extends around the bottom surface 412 of the outer channel 410, so that the second monolithic member 406 may be selectively rotated relative to the first monolithic member 404.

The second monolithic member 406 defines a clamping surface 414 configured to engage the seat track 402, and a threaded shaft 416 that extends from the clamping surface 414 and that is sized to be inserted into a hole 418 defined by the seat track 402.

The third monolithic member 408 is tethered to the first monolithic member 404 via a tether 420, and defines a clamping surface 422 that is configured to engage seat track 402 opposite the clamping surface 414 of the second monolithic member. The third monolithic member 408 also defines a threaded hole 424 that is configured to mate with the threaded shaft 416 of the second monolithic member. The third monolithic member 408 also includes a pair of restrictive portions 426 that are configured to restrict the positioning of the third monolithic member 408 to a desired position relative to the seat track 402, so that the threaded hole 424 of the third monolithic member 408 aligns with the hole 418 defined by the seat track 402.

FIG. 9 illustrates clamp 400 in an unclamped configuration, and FIG. 10 illustrates clamp 400 in a clamped configuration. A user may selectively secure the clamp 400 to a seat track 402 by appropriately positioning the third monolithic member 408 so that the threaded hole 424 aligns with the hole 418 of the seat track 402, inserting the threaded shaft 416 of the second monolithic member 406 through the hole 418 and into threading engagement with the threaded hole 424. Accordingly, when a user selectively rotates the second monolithic member 406 in a tightening direction, the clamping surface 414 and the clamping surface 422 will translate toward each other and engage opposite sides of the seat track 402, thereby securing the clamp 400 to the seat track 402. As a result, the clamp 400 is secured to the seat track 402 in a precise position relative to known properties of the seat track 402, such as the hole 418. To remove the clamp 400 from the seat track 402, a user simply rotates the second monolithic member 406 in the opposite direction until the threaded shaft 414 disengages the threaded hole 424.

Illustrative, non-exclusive examples of inventive subject matter according to the present disclosure are described in the following enumerated paragraphs:

A. An apparatus, comprising:
a first monolithic member; and
a second monolithic member coupled to the first monolithic member and configured to be selectively moved relative to the first monolithic member;
wherein the first monolithic member and the second monolithic member are configured so that the second monolithic member cannot be decoupled from the first monolithic member without alteration (or optionally without destruction or further optionally without damage) of one of the first monolithic member and the second monolithic member.

A1. The apparatus of paragraph A, wherein the first monolithic member is unitary in structure and the second monolithic member is unitary in structure.

A2. The apparatus of any of paragraphs A-A1, wherein the first monolithic member and the second monolithic member are free of welds.

A3. The apparatus of any of paragraphs A-A2, wherein the second monolithic member is configured to be selectively translated linearly relative to the first monolithic member.

A4. The apparatus of any of paragraphs A-A3, wherein the second monolithic member is configured to be selectively rotated relative to the first monolithic member.

A5. The apparatus of any of paragraphs A-A4, wherein at least one of the first monolithic member and the second monolithic member (and optionally the third monolithic member when related to any of paragraphs A10-A10.3.1.2) includes a mount configured to selectively couple (and optionally decouple) an associated structure (optionally a laser projection alignment target) to (and optionally from) the apparatus (optionally for use with a laser projection alignment system).

A5.1 The apparatus of paragraph A5, wherein the mount is configured to selectively couple the associated structure to the apparatus in a predetermined precise position relative to the apparatus.

A5.2 The apparatus of any of paragraphs A5-A5.1 in combination with the associated structure, wherein the associated structure is coupled to one of the first monolithic member and the second monolithic member.

A6. The apparatus of any of paragraphs A-A5.2, wherein the first monolithic member and the second monolithic member (or optionally the third monolithic member when relating to any of paragraphs A10-A10.3.1.2) collectively define a clamping structure that is configured to selectively secure the apparatus to an article.

A7. The apparatus of any of paragraphs A-A6, wherein at least one of the first monolithic member and the second monolithic member (and optionally the third monolithic member when relating to any of paragraphs A10-A10.3.1.2) define (and optionally include) an apparatus alignment structure that is configured to mate with a corresponding article alignment structure for precise alignment of the apparatus relative to an article.

A7.1 The apparatus of any of paragraphs A6-A7, wherein the article includes one or more of a portion of an aircraft, a portion of an aircraft associated with a precise location to be identified utilizing a laser projection device, an aircraft fuselage frame member, an aircraft cargo bay stanchion, and an aircraft seat track.

A7.2 The apparatus of any of paragraphs A7-A7.1, wherein the apparatus alignment structure is configured to mate with one or more of holes defined by an aircraft fuselage frame member, a slot defined by an aircraft cargo bay stanchion, and a hole defined by an aircraft seat track.

A7.3 The apparatus of any of paragraphs A7-A7.2 when depending from paragraph A5.1, wherein the mount is configured to selectively couple the associated structure to the apparatus in a predetermined precise position relative to the apparatus alignment structure.

A8. The apparatus of any of paragraphs A-A7.3, wherein the first monolithic member and the second monolithic member are constructed utilizing an additive manufacturing method so that the first monolithic member and the second monolithic member are grown so that the second monolithic member is coupled to the first monolithic member.

A9. The apparatus of any of paragraphs A-A8,
wherein the first monolithic member defines a bore; and
wherein the second monolithic member extends at least partially into (and optionally through) the bore to couple the second monolithic member to the first monolithic member.

A9.1 The apparatus of paragraph A9, wherein the second monolithic member includes at least one restrictive portion that is sized and/or shaped to restrict passage of the restrictive portion through the bore to thereby restrict decoupling of the second monolithic member form the first monolithic member.

A9.1.1 The apparatus of paragraph A9.1,
wherein the first monolithic member defines a first clamping surface;
wherein the second monolithic member includes:
an elongate portion extending through the bore;
a first end portion extending transverse from the elongate portion;
an intermediate portion extending transverse from the elongate portion opposite the first end portion; and
a second end portion extending transverse from the intermediate portion, generally parallel to the elongate portion, and generally toward the first end portion, wherein the second end portion defines a second clamping surface;
wherein the at least one restrictive portion includes one or more of the first end portion, the intermediate portion, and the second end portion; and
wherein the second monolithic member is configured to be selectively rotated and translated linearly within the bore amongst a plurality of positions including a clamping position, in which the first clamping surface and the second clamping surface generally face each other.

A9.1.1.1 The apparatus of paragraph A9.1.1, wherein the first monolithic member includes at least one projection that is configured to mate with at least one corresponding article alignment structure for precise alignment of the apparatus relative to an article.

A9.1.1.1.1 The apparatus of paragraph A9.1.1.1, wherein the at least one projection includes two projections configured to mate with alignment holes of an aircraft fuselage frame member.

A9.1.1.1.2 The apparatus of any of paragraphs A9.1.1.1-A9.1.1.1.1, wherein the at least one projection extends from the first clamping surface.

A9.1.1.2 The apparatus of any of paragraphs A9.1.1-A9.1.1.1.2, further comprising:
a shaft (and optionally a threaded shaft) coupled to and extending from the first monolithic member, generally parallel to the elongate portion of the second monolithic member; and
an anchor coupled to (and optionally a nut threaded to) the shaft and configured to be selectively translated along the shaft;
wherein the first end region of the second monolithic member defines a channel;
wherein the shaft is positioned at least partially within the channel when the second monolithic member is in the clamping position; and
wherein the anchor is configured to be selectively translated along the shaft to engage the first end region of the second monolithic member to selectively retain the second monolithic member in the clamping position.

A9.1.1.2.1 The apparatus of paragraph A1.1.2.2, wherein the shaft and the anchor are configured so that the anchor cannot be decoupled from the shaft without alteration (or optionally without destruction or further optionally without damage) of one of the shaft and the anchor.

A9.1.1.2.2 The apparatus of any of paragraphs A9.1.1.2-A9.1.1.2.1, wherein the shaft and the first monolithic member are configured so that the shaft cannot be decoupled from the first monolithic member without alteration (or optionally without destruction or further optionally without damage) of one of the shaft and the first monolithic member.

A9.1.1.2.3 The apparatus of any of paragraphs A9.1.1.2-A9.1.1.2.1, wherein the first monolithic member includes the shaft.

A9.1.2 The apparatus of paragraph A9.1,
wherein the second monolithic member includes a body and a shaft extending from the body, wherein the shaft defines an outer channel having a bottom surface; and
wherein the first monolithic member is positioned at least partially in the outer channel of the second monolithic member so that the bore of the first monolithic member extends around the bottom surface of the outer channel of the second monolithic member, and wherein the first monolithic member is configured to be selectively rotated relative to the second monolithic member.

A9.1.2.1 The apparatus of paragraph A9.1.2, further comprising:
at least one (and optionally more than one) screw extending through and coupled to the first monolithic member, wherein the at least one screw is configured to be selectively translated relative to the first monolithic member, and wherein the at least one screw defines a first clamping surface configured to engage an article;
wherein the second monolithic member defines a second clamping surface configured to engage the article; and
wherein the apparatus is configured to be selectively configured between an unclamped configuration and a clamped configuration, in which the apparatus is secured to the article, wherein in the clamped configuration, the first clamping surface and the second clamping surface engage opposite sides of the article.

A9.1.2.1.1 The apparatus of paragraph A9.1.2.1, wherein the apparatus is configured so that when in the unclamped configuration, the first monolithic body and at least the shaft of the second monolithic body may be inserted through a passage in the article until the second clamping surface engages the article, so that the first monolithic body may be rotated relative to the second monolithic body, and so that the at least one screw may be rotated relative to the first monolithic body until the first clamping surface engages the article, resulting in the apparatus being in the clamped configuration.

A9.2 The apparatus of any of paragraphs A9-A9.1, wherein the second monolithic member includes a disc-shaped region positioned within the bore of the first monolithic member and wherein the disc-shaped region and the bore are configured so that the disc-shaped region cannot be removed from the bore without alteration (or optionally without destruction or further optionally without damage) of one of the first monolithic member and the second monolithic member.

A10 The apparatus of any of paragraphs A-A9.2, further comprising:
a third monolithic member configured to be selectively coupled to at least one of the first monolithic member and the second monolithic member.

A10.1 The apparatus of paragraph A10, wherein the third monolithic member is tethered to one of the first monolithic member and the second monolithic member.

A10.2 The apparatus of any of paragraphs A10-A10.1,
wherein the first monolithic member defines a first clamping surface configured to engage an article;
wherein the second monolithic member defines a hole (and optionally a threaded hole);
wherein the third monolithic member includes:
a body that defines a second clamping surface configured to engage the article; and
a shaft (and optionally a threaded shaft) extending from the body; and
wherein the apparatus is configured to be selectively configured between an unclamped configuration and a clamped configuration, in which the apparatus is secured to the article, wherein in the clamped configuration, the first clamping surface and the second clamping surface engage opposite sides of the article, and the shaft extends through article, through the bore of the first monolithic member, and into the hole of the second monolithic member.

A10.2.1 The apparatus of paragraph A10.2, wherein the apparatus is configured so that when in the clamped configuration and when a user rotates the second monolithic member, the first clamping surface and the second clamping surface translate toward each other.

A10.2.2 The apparatus of any of paragraphs A10.2-A10.2.1, wherein the first clamping surface and the second clamping surface are configured to precisely mate with corresponding structure of the article, wherein the corresponding structure optionally includes a mono-ball.

A10.3 The apparatus of any of paragraphs A10-A10.1,
wherein the first monolithic member defines a bore; and
wherein the second monolithic member defines an outer channel having a bottom surface, wherein the first monolithic member is positioned at least partially in the outer channel of the second monolithic member so that the bore extends around the bottom surface of the outer channel of the second monolithic member, and wherein the second monolithic member is configured to be selectively rotated relative to the first monolithic member.

A10.3.1 The apparatus of paragraph A10.3,
wherein the second monolithic member defines a first clamping surface configured to engage an article, and wherein the second monolithic member includes a shaft (and optionally a threaded shaft) extending from the first clamping surface;
wherein the third monolithic member defines a second clamping surface configured to engage the article, and wherein the third monolithic member further defines a hole (and optionally a threaded hole) configured to mate with the shaft; and
wherein the apparatus is configured to be selectively configured between an unclamped configuration and a clamped configuration, in which the apparatus is secure to the article, wherein in the clamped configuration, the first clamping surface and the second clamping surface engage opposite sides of the article, and the shaft extends through the article and into the hole of the third monolithic member.

A10.3.1.1 The apparatus of paragraph A10.3.1, wherein the apparatus is configured so that when in the clamped configuration and when a user rotates the second monolithic member, the first clamping surface and the second clamping surface translate toward each other.

A10.3.1.2 The apparatus of any of paragraphs A10.3-A10.3.1.1, wherein the third monolithic member includes a restrictive portion configured to restrict positioning of the third monolithic member relative to the article so that the hole precisely aligns with a corresponding hole of the article.

B. A method of forming the apparatus of any of paragraphs A-A10.3.1.2, comprising:
utilizing an additive manufacturing process to form the first monolithic member and the second monolithic member so that the first monolithic member and the second monolithic member are grown so that the second monolithic member is coupled to the first monolithic member.

C. The use of the apparatus of any of paragraphs A-A10.3.1.2.

D. A method; comprising:
securing at least two apparatuses of any of paragraphs A-A10.3.1.2 to an article, wherein the apparatuses each include a laser projection alignment target coupled to one of the first monolithic member and the second monolithic member (and optionally the third monolithic member when related to any of paragraphs A10-A10.3.1.2) of the respective apparatus; and
projecting a laser beam from a laser projection device at each of the laser projection alignment targets so that the laser projection device may calibrate the relative position between the laser projection alignment targets.

D1. The method of paragraph D, wherein the method is used during assembly of a structure, and optionally during assembly of an aircraft.

D2. The method of paragraph D, wherein the method is used during the assembly of a spacecraft.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:
1. A clamp, comprising:
a first monolithic member;
a second monolithic member coupled to the first monolithic member and configured to be selectively moved relative to the first monolithic member; and
a third monolithic member configured to be selectively coupled to at least one of the first monolithic member and the second monolithic member;
wherein the first monolithic member and the second monolithic member are configured so that the second monolithic member cannot be decoupled from the first monolithic member without destruction of one of the first monolithic member and the second monolithic member;
wherein the first monolithic member defines a bore and a first clamping surface, configured to engage an article;

wherein the second monolithic member defines a threaded hole;

wherein the third monolithic member includes:
a body that defines a second clamping surface, configured to engage the article; and
a threaded shaft extending from the body; and wherein the clamp is configured to be selectively configured between an unclamped configuration and a clamped configuration, in which the clamp is secured to the article, wherein in the clamped configuration, the first clamping surface and the second clamping surface engage opposite sides of the article, and the threaded shaft extends through the article, through the bore of the first monolithic member, and into the threaded hole of the second monolithic member, and wherein when a user rotates the second monolithic member, the first clamping surface and the second clamping surface translate toward each other.

2. The clamp of claim 1, wherein the third monolithic member is tethered to one of the first monolithic member and the second monolithic member.

3. The clamp of claim 1, wherein the first clamping surface and the second clamping surface are configured to precisely mate with a mono-ball.

4. A method of forming the clamp of claim 1, comprising:
utilizing an additive manufacturing process to form the first monolithic member and the second monolithic member so that the first monolithic member and the second monolithic member are grown so that the second monolithic member is coupled to the first monolithic member.

5. A method of assembling a structure, the method comprising:
securing at least two clamps according to claim 1 to the article, wherein the clamps each include a laser projection alignment target coupled to one of the first monolithic member, the second monolithic member, and the third monolithic member of the respective clamp; and
projecting a laser beam from a laser projection device at each of the laser projection alignment targets so that the laser projection device may calibrate a relative position between the laser projection alignment targets.

6. The method of claim 5, wherein the method is used during assembly of an aircraft.

7. The method of claim 5, wherein the method is used during the assembly of a spacecraft.

8. The clamp of claim 1, wherein at least one of the first monolithic member, the second monolithic member, and the third monolithic member include an apparatus alignment structure that is configured to mate with a corresponding article alignment structure of the article for precise alignment of the clamp relative to the article.

9. The clamp of claim 8, wherein the apparatus alignment structure is configured to mate with one or more of holes defined by an aircraft fuselage frame member, a slot defined by an aircraft cargo bay stanchion, and a hole defined by an aircraft seat track.

10. The clamp of claim 1, wherein the article includes one or more of a portion of an aircraft, a portion of an aircraft associated with a precise location to be identified utilizing a laser projection device, an aircraft fuselage frame member, an aircraft cargo bay stanchion, and an aircraft seat track.

11. The clamp of claim 10 in combination with the article, wherein the clamp is in the clamped configuration.

12. The clamp of claim 1 in combination with a laser projection alignment target, wherein one of the first monolithic member, the second monolithic member, and the third monolithic member includes a mount, and wherein the laser projection alignment target is coupled to the mount.

13. The combination of claim 12, wherein the third monolithic member includes the mount.

14. The combination of claim 12 in further combination with the article, wherein the clamp is in the clamped configuration.

15. The combination of claim 14, wherein the article includes one or more of a portion of an aircraft, a portion of an aircraft associated with a precise location to be identified utilizing a laser projection device, an aircraft fuselage frame member, an aircraft cargo bay stanchion, and an aircraft seat track.

* * * * *